(12) United States Patent
Foster et al.

(10) Patent No.: US 11,697,463 B2
(45) Date of Patent: Jul. 11, 2023

(54) BICYCLE SECURING APPARATUS

(71) Applicant: PPT Technologies, San Clemente, CA (US)

(72) Inventors: Clark Foster, San Clemente, CA (US); Frederick Lomax, Rainier, WA (US)

(73) Assignee: PPT Technologies, San Clemente, CA (US)

( * ) Notice: Subject to any disclaimer, the term of this patent is extended or adjusted under 35 U.S.C. 154(b) by 0 days.

(21) Appl. No.: 17/633,166

(22) PCT Filed: Aug. 5, 2020

(86) PCT No.: PCT/US2020/045055
§ 371 (c)(1),
(2) Date: Feb. 4, 2022

(87) PCT Pub. No.: WO2021/026265
PCT Pub. Date: Feb. 11, 2021

(65) Prior Publication Data
US 2022/0266936 A1    Aug. 25, 2022

Related U.S. Application Data

(60) Provisional application No. 62/882,701, filed on Aug. 5, 2019.

(51) Int. Cl.
*B62H 3/10* (2006.01)
*B60R 9/06* (2006.01)
(Continued)

(52) U.S. Cl.
CPC ................. *B62H 3/10* (2013.01); *B60R 9/06* (2013.01); *B60R 9/10* (2013.01); *B62H 1/08* (2013.01)

(58) Field of Classification Search
CPC .... B62H 1/08; B62H 3/10; B60R 9/06; B60R 9/10
(Continued)

(56) References Cited

U.S. PATENT DOCUMENTS 5,025,932 A   6/1991 Jay
5,244,101 A   9/1993 Palmer et al.
(Continued)

FOREIGN PATENT DOCUMENTS

DE   202006012354 U1   12/2006
WO   WO 2018/111098 A1   6/2018

OTHER PUBLICATIONS

International Search Report and Written Opinion, dated Nov. 19, 2020, for the corresponding International Application No. PCT/US2020/045055 in 11 pages.

*Primary Examiner* — Minnah L Seoh
*Assistant Examiner* — Felicia L. Brittman
(74) *Attorney, Agent, or Firm* — Polsinelli PC

(57) ABSTRACT

A bike securing apparatus (100) having a vertical member (1), a first engagement member (2), that coupled to the vertical member (1) and comprises a means for attaching to a bicycle pedal (63); and an anti-rotation member (3), that coupled to the vertical member (1) or the first engagement member (2), and has a means for attaching to a bicycle (6). The first engagement member (2) is configured to attach to the bicycle pedal (63) and limit movement of the bicycle pedal (63), and the anti-rotation member (3) is configured to attach to the bicycle (6) at a location other than said bicycle pedal (63) and limit rotation of a said bicycle (6) about the first engagement member (2).

20 Claims, 13 Drawing Sheets

(51) Int. Cl.
*B60R 9/10* (2006.01)
*B62H 1/08* (2006.01)

(58) Field of Classification Search
USPC ........................................... 211/17, 20
See application file for complete search history.

(56) References Cited

U.S. PATENT DOCUMENTS

| | | |
|---|---|---|
| 6,626,349 B2 | 9/2003 | Burgess |
| 8,851,301 B1 | 10/2014 | Ho |
| 9,371,042 B1 * | 6/2016 | Dratewski ................. B60R 9/06 |
| 2006/0169423 A1 | 8/2006 | Chuang |
| 2008/0087776 A1 | 4/2008 | Chuang |

* cited by examiner

BICYCLE SECURING APPARATUS

CROSS REFERENCE TO RELATED APPLICATIONS

This application is a United States National Stage Entry of PCT Application No. PCT/US2020/045055, filed Aug. 5, 2020, which claims benefit to the U.S. Provisional Application 62/882,701 filed on Aug. 5, 2019, the contents of which are entirely incorporated by reference herein.

FIELD

The subject matter herein generally relates to assemblies used to secure a bicycle.

BACKGROUND

In the area of storage, maintenance, and transport of bicycles, large bulky racks are used. Generally, these racks tend to extend vertically, to lift the bicycle, and horizontally, to provide supports for the bicycle. This type of design results in a very bulky and heavy rack that is not easily stored. Often, the case of racks used on automobiles, the inability to easily store and/or couple the rack to the automobile results in a user just leaving the rack on the vehicle. This can cause increased wear of the vehicle and a decrease in gas mileage. The racks can also increase the frustration of the users as they make it harder to access the rear compartments, be it a trunk, a hatchback, and/or a bed of a truck. They often time prevent the vehicle from properly using standard safety features such as back-up sensors and rear cameras. They can also prevent the car from using typical drive-through car wash facilities.

BRIEF DESCRIPTION OF THE DRAWINGS

Implementations of the present technology will now be described, by way of example only, with reference to the attached figures, wherein.

DETAILED DESCRIPTION

Figure 1:
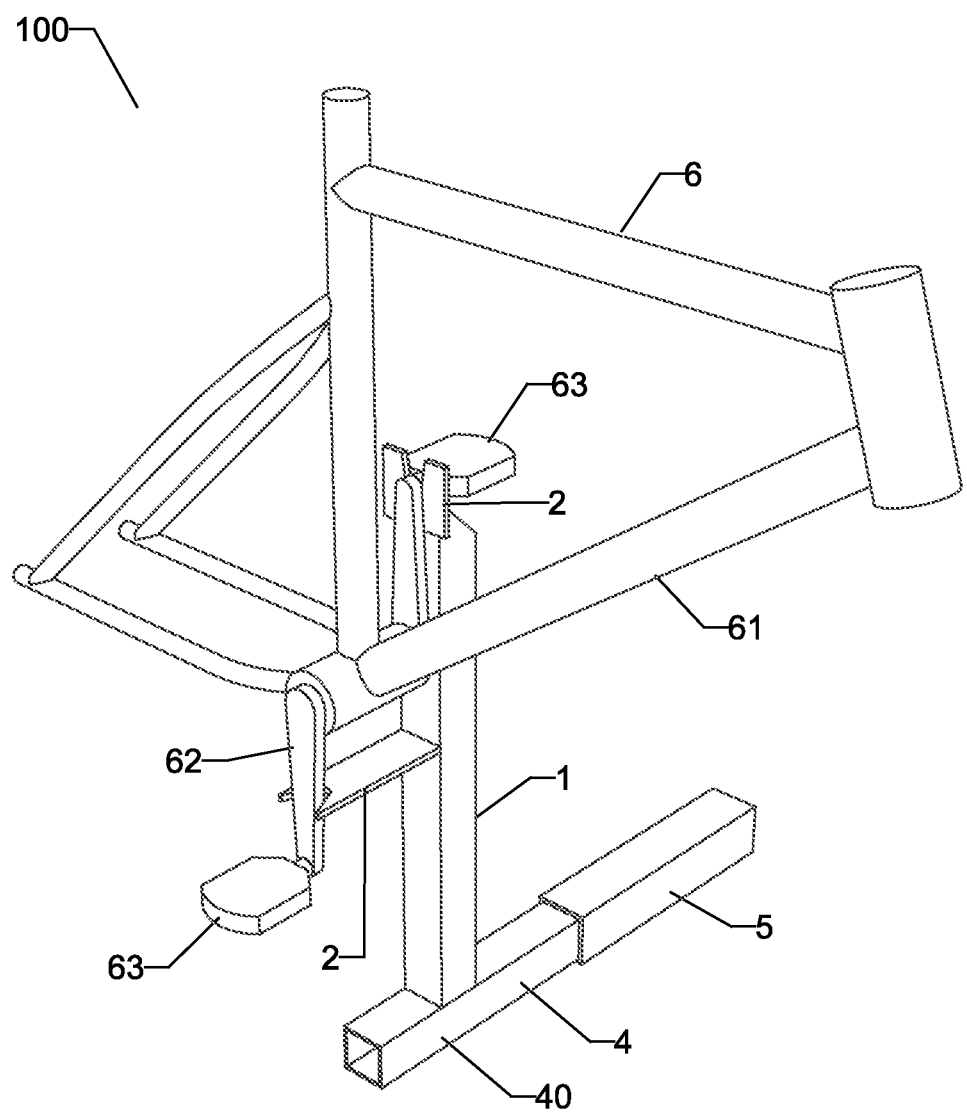
FIG. 1 shows an embodiment of the bicycle securing apparatus securing a bicycle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether integral with, directly attached, or indirectly attached through intervening components, and is not necessarily limited to physical connections. The connection can be such that the objects are permanently connected or releasably connected. The term "inside" indicates that at least a portion of a region is partially contained within a boundary formed by the object. The term "substantially" is defined to be essentially conforming to the particular dimension, shape or other word that substantially modifies, such that the component can be, but need not be, exact. For example, substantially cylindrical means that the object is or resembles a cylinder, but can have one or more deviations from a true cylinder. The term "comprising" means "including, but not necessarily limited to"; it specifically indicates open-ended inclusion or membership in a so-described combination, group, series and the like.

The present disclosure is often described in reference to a bicycle securing apparatus 100 that is attached to a vehicle. However, it is to be understood that the bicycle attachment can be used as a stand or a storage apparatus for bicycles.

FIG. 1 illustrates an embodiment of a bicycle securing apparatus 100. The embodiment of the bicycle securing apparatus 100 comprises a vertical member 1, and one or more engagement members 2. Some embodiments comprise a base 4.

In some embodiments, the bicycle securing apparatus 100 comprises a vertical member 1, an engagement member 2, and an anti-rotation member 3. In some embodiments, the bicycle securing apparatus 100 comprises a vertical member 1 and two engagement members 2.

In some embodiments, there is a first engagement member 2 and a second engagement member 2. In some embodiments, the first engagement member 2 is an inner engagement member 21, and if present, the second engagement member 2 is an outer engagement member 22. In some embodiments, the first engagement member 2 is an outer engagement member 22, and if present, the second engagement member 2 is an inner engagement member 21. The anti-rotation member is coupled to the vertical element 1 and/or the engagement member 2 by an anti-rotation connector 143. In some embodiments, the anti-rotation connectors have a fixed length but is able to move relative to either or both the anti-rotation member 3 and the vertical element 1 and/or the engagement member 2

In some embodiments, the vertical member 1 comprises a structural member capable of supporting the weight of a bicycle 6. In some embodiments, the vertical member 1 comprises metal, alloy, carbon fiber, plastic, elastomers, or a combination thereof.

In some embodiments, the first engagement member 2 comprises a crank locating means, a pedal attachment means, a pedal stem attachment means, or a combination thereof. In some embodiments, the second engagement member 2 comprises a crank locating means, a pedal attachment means, a pedal stem attachment means, or a combination thereof. In some embodiments, the crank locating means and/or the bicycle pedal securing means comprises projections, two or more, (211 and/or 221). The inner engagement means 21 comprises one or more inner engagement projections 211, which is configured to secure the bicycle pedal 63, the pedal stem 631, or a combination thereof, of the inner pedal 63. In some embodiments, there are two or more inner engagement projections 211. In some embodiments comprising an outer engagement means 22, the outer engagement means 22 comprises two or more outer engagement projections 221 that accepts the crank 62 inside the two or more outer engagement projections 221.

In some embodiments, the bicycle securing apparatus 100 comprises an inner engagement means 21 and a down tube 61 engagement means. The inner engagement means 21 is configured to secure the bicycle pedal 63 and bears most, if not all of the weight of the bicycle 6, and the down tube 61 engagement means is configured to secure the down tube 61 and prevents rotation of the bicycle 6 relative to inner engagement means 21.

In some embodiments, the bicycle securing apparatus 100 comprises an inner engagement means 21, an outer engagement means 22, and an anti-rotation means 3. In some embodiments, the inner engagement means comprises a means to attach to a pedal. The inner engagement means 21 is configured to secure the bicycle pedal 63 and bears most, if not all, of the weight of the bicycle 6. The anti-rotation means is configured to secure the down tube 61, or some other part of the bicycle 6, and prevents rotation of the bicycle 6 relative to bicycle pedal 63 engagement means. The outer engagement means is configured to secure the outer crank 62 and prevent rotation about the horizontal access. In some embodiments, the inner engagement member 21 and the outer engagement member 22 define a plane. In some embodiments, when a bicycle 6 is attached, the plane is vertical.

The outer engagement means 22 engages the outer pedal 63 and/or crank 62 as it extends from the vertical member 1 below the chainrings.

In some embodiment, the vertical member 1 can be coupled to a base 4. In some embodiments, the base 4 comprises a base body 40 that is sized to be inserted into a hitch receiver 5. The size and shape can of the base body 40 can be preselected to correspond with a preselected hitch receiver 5 (e.g., 1-¼ inches (2.54-0.635 centimeters), 2 inches (5.08 centimeters), 2-½ inches (5.08-1.27 centimeters), and 3 inches (7.62 centimeters)). In some embodiments, the base 4 comprises a hitch receiver 5 securing means such as a bolt, a lock, or other mechanism known in the art that will secure the base 4 to the hitch receiver 5.

Figure 2:
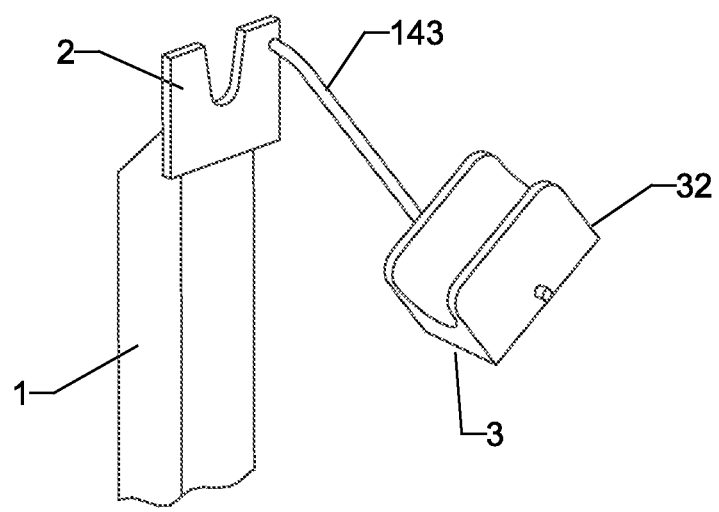
FIG. 2 shows an embodiment of the vertical member, an engagement member, and an anti-rotation member.

FIG. 2 illustrates an embodiment of a bicycle securing apparatus 100 comprising comprises a vertical member 1, an engagement member 2, and an anti-rotation member 3. The engagement member 2 will support the weight of the bicycle 6, and the anti-rotation member 3 will prevent rotation of the bicycle 6 about the engagement member 2. In some embodiments, the anti-rotation member 3 will comprise an anti-rotation receiver 32 that accepts a portion of a bicycle 6. Some embodiments further comprise an anti-rotation securing member 33 that will help better secure the bicycle 6 in the anti-rotation receiver 32.

In some embodiments, the anti-rotation member 3 comprises a bicycle attachment means. In some embodiments, the bicycle attachment means comprises an anti-rotation securing member 33 (not shown in FIG. 2) and the anti-rotation receiver 32. In some embodiments, the anti-rotation receiver 32 defines a concave accepting area 321 that is configured to accept a down tube 61, or some other bicycle element a bicycle 6. It is understood that the size and shape of down tubes of bicycles vary, and in some embodiments, the anti-rotation receiver 32 is flexible and able to, at least partially if not entirely, wrap around the down tube 61 when the down tube 61 is inside the concave accepting area 321. In some embodiments, the anti-rotation securing member 33 and the anti-rotation receiver 32, at least partially, if not entirely, wrap the down tube 61 when secured. While the anti-rotation member 3 is shown as attaching to a down tube 61, it is understood that in some embodiments, the anti-rotation member 3 is configured to be attached to other parts of the bicycle 6. In some embodiments, the anti-rotation member 3 is configured to be attached to the seat tube 61, the crank 62 stay, the seat post, the seat stay, the top tube 61, the fork, the wheels/tires/spokes, other parts of a bicycle 6, or a combination thereof. In some embodiments, the anti-rotation securing member 33 comprises an anti-rotation strap 331.

Figure 3:
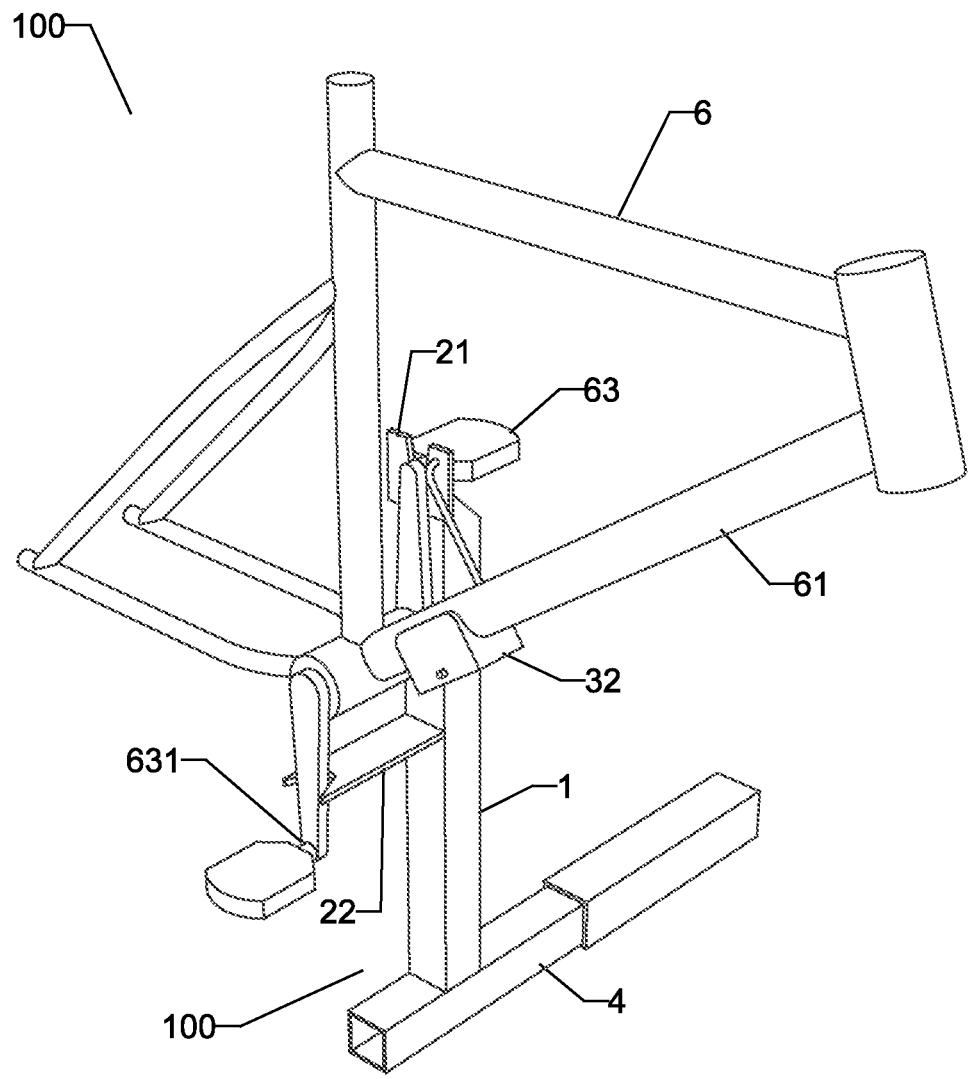
FIG. 3 shows an embodiment of the bicycle securing apparatus securing a bicycle.
Figure 4:
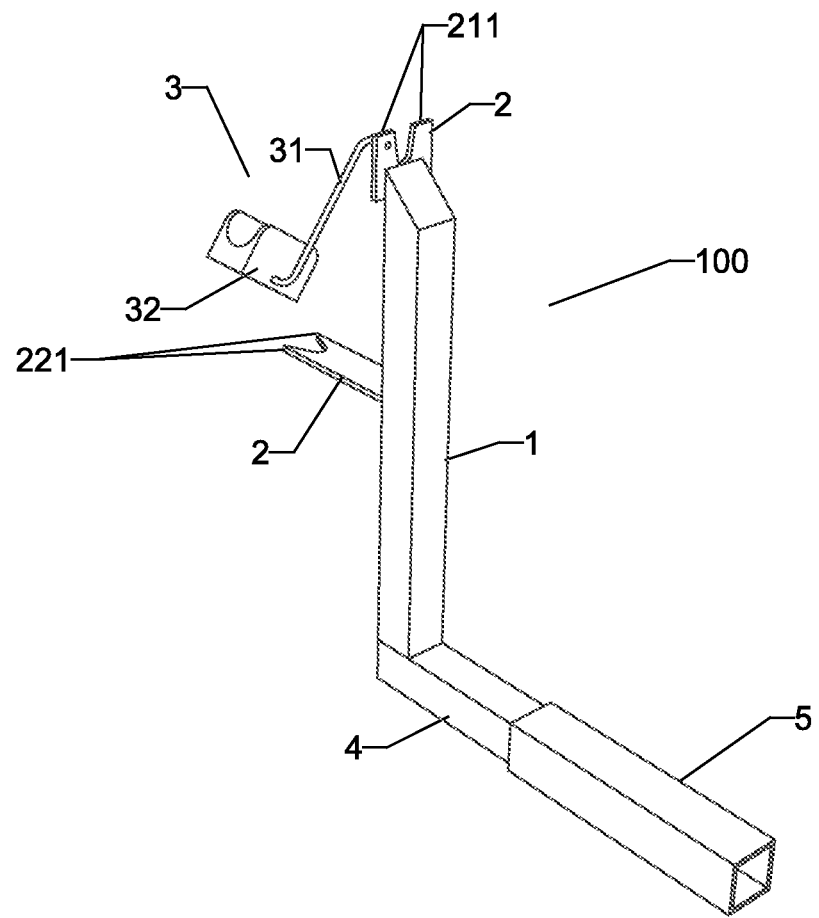
FIG. 4 shows an embodiment of the bicycle securing apparatus.

FIGS. 3 and 4 illustrate embodiments of a bicycle securing apparatus 100 comprising a vertical member 1, a first engagement member 2 and a second engagement member 2, and an anti-rotation member 3. In some embodiments, the first engagement member 2 is an inner engagement member 21, the second engagement is an outer engagement member 22. The inner engagement projections 211 position a pedal stem 631 inside, and the outer engagement projections 221 position a crank 62 inside. The anti-rotation member 3 has the down tube 61 located inside the anti-rotation receiver 32. Some embodiments further comprise an anti-rotation securing member 33 that will help better secure the bicycle 6 in the anti-rotation receiver 32. As indicated above, some embodiments will further comprise a base 4 that is configured to be inserted into a hitch receiver 5.

Figure 5:
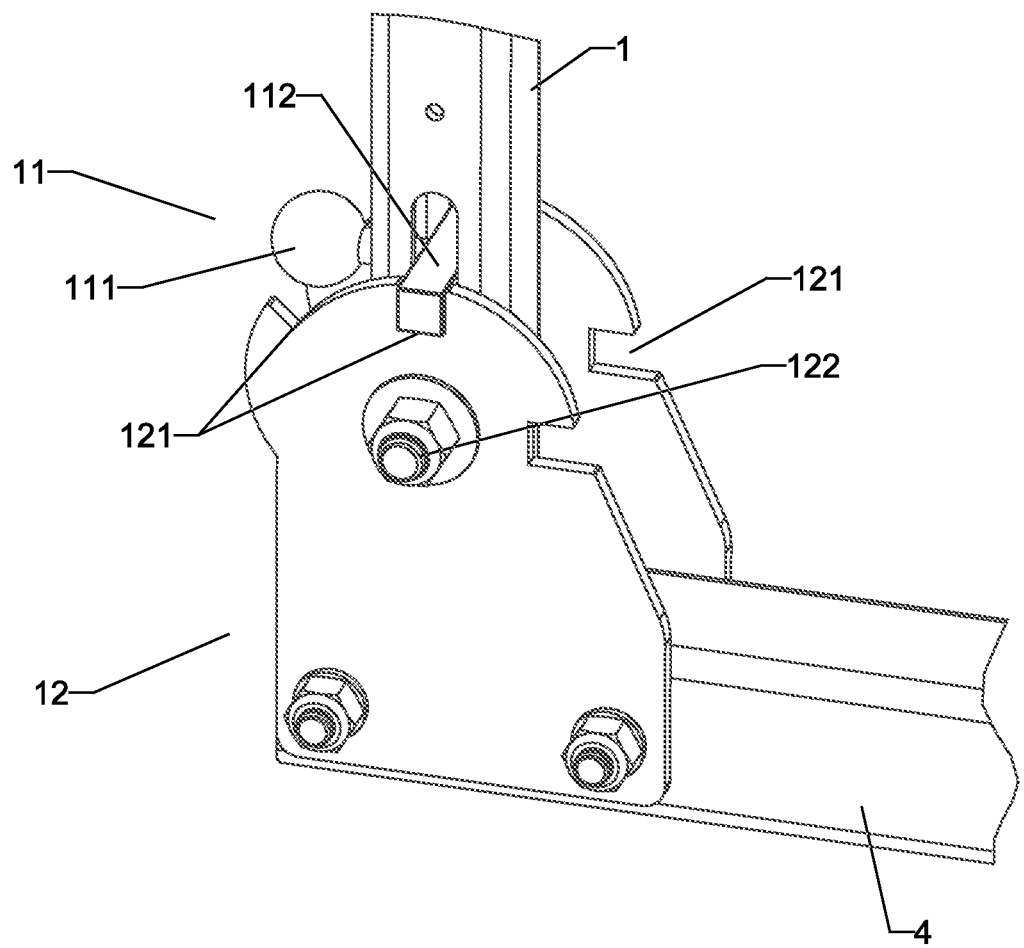
FIG. 5 shows an embodiment of a selector and a position selector.

FIG. 5 illustrates an embodiment of a position selector 12. In some embodiments, the vertical member 1 is configured to selectively move between a first position 121 and a second position 121 in relation to the base 4. In some embodiments, the vertical member 1 is configured to selectively move to a third position 121. The number of positions is not limited and can be determined as desired. The different positions 121 define different angles defined by the vertical member 1 and the base 4 (e.g., substantially parallel, substantial right angle, obtuse). In some embodiments, the position selector 12 couples the vertical member 1 to the base 4. The vertical member 1 can comprise a selector 11 that is configured to actuate from a release position to an engaged position. In some embodiments, the position selector 12 defines two or more securing positions 121. In some embodiments, a securing position 121 define a vertical securing position 121 so that the vertical member 1 is situated at in or about 90 degrees. In some embodiments, a securing position 121 define a parallel position, that can be considered a storage securing position 121, so that the vertical member 1 is situated at in or about parallel and above the base 4. In such a position, the bicycle securing apparatus 100 can be more easily stored in the garage or even the trunk of an automobile. In some embodiments, a securing position 121 defines an obtuse securing position 121 so that the vertical member 1 and the base 4 define an obtuse angle. In some embodiments, the position selector 12 defines a vertical securing position 121, a storage position, an obtuse securing position 121, one or more additional securing positions 121, or a combination thereof.

Figure 6:
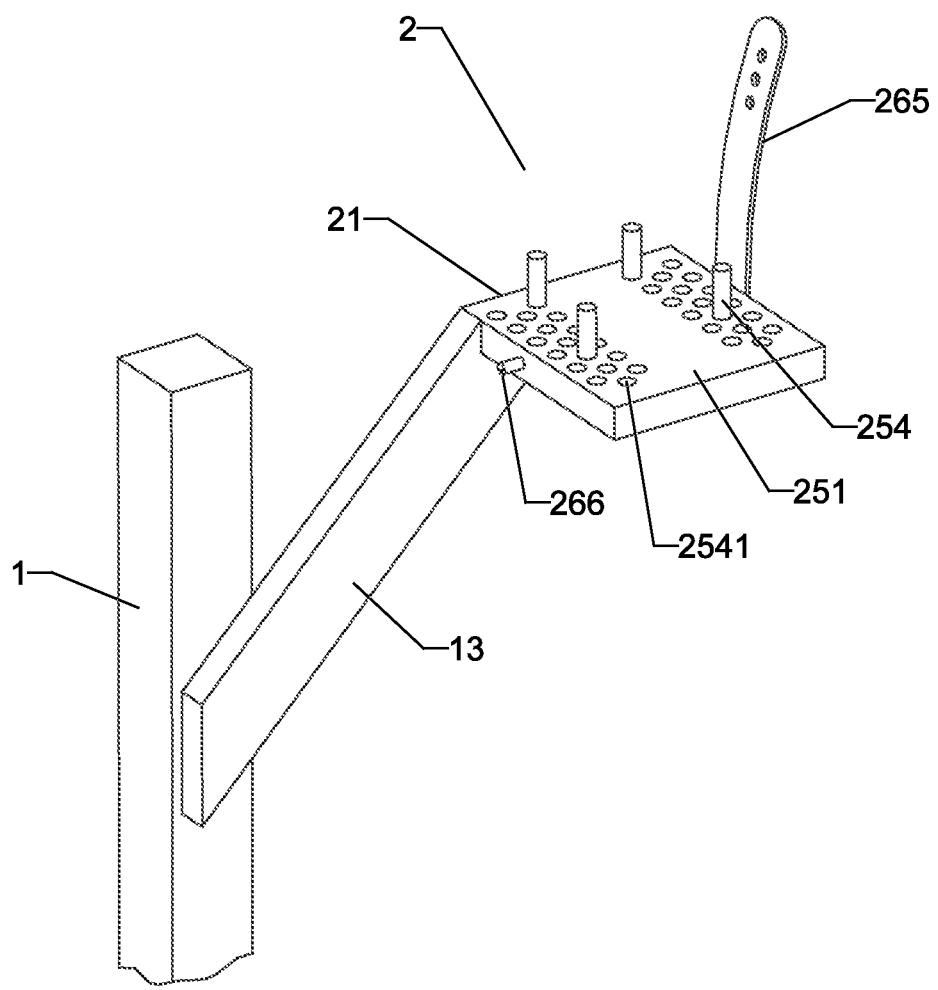
FIG. 6 shows an embodiment of an inner engagement member and a pedal platform securing element having a strap.

FIG. 6 illustrates an embodiment bicycle securing apparatus 100 comprising a lateral extension element 13 coupled to the vertical member 1. In some embodiments, the lateral extension element 13 extends diagonally from the vertical member 1. In some embodiments, the lateral extension element 13 extends horizontally from the vertical member 1. In some embodiments, the lateral extension element 13 can be adjusted vertically to accommodate different size bicycles.

Figure 7:
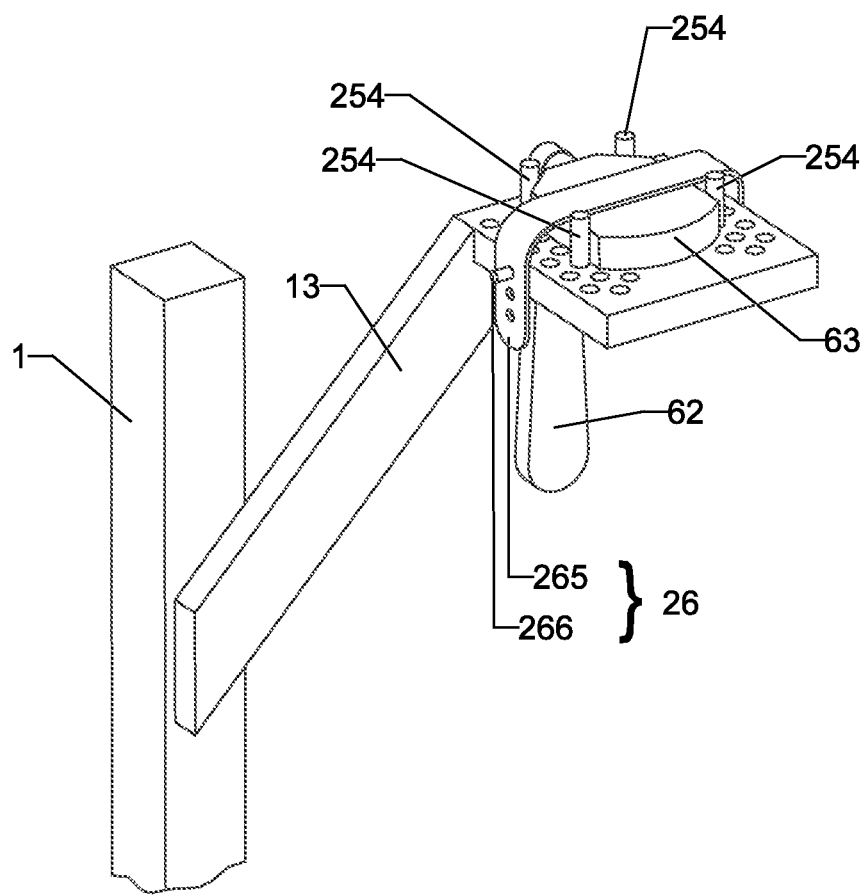
FIG. 7 shows an embodiment of an inner engagement member and a pedal platform securing element having a strap that is secured.
Figure 8:
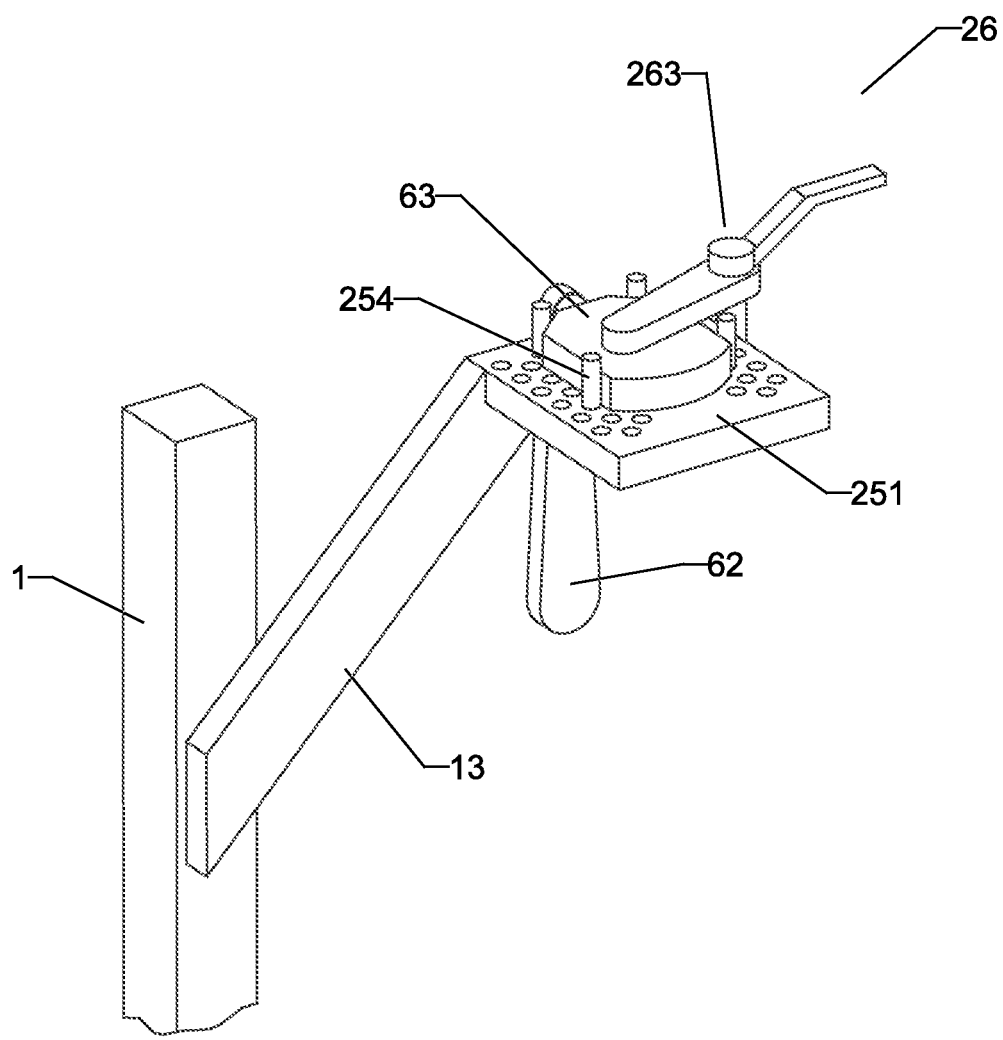
FIG. 8 shows an embodiment of an inner engagement member and a pedal platform securing element having a rotating element securing a pedal.

FIGS. 6, 7, and 8 illustrate embodiments of an engagement member 2 comprising a pedal support 25. The pedal support 25 comprises a pedal platform 251. In some embodiments, projections comprise adjustable inner engagement projections 254. In some embodiments, the pedal platform 251 defines one or more pedal platform holes 2541 in which one or more adjustable inner engagement projections 254 to enable a user to provide a design to secure the bicycle pedal 63 to prevent or limit movement of the bicycle pedal 63 in relation to the pedal platform 251. In some embodiments, the pedal platform 251 defines a notch 210 that will allow the crank 62 to reside inside. In some embodiments, the inner engagement projections 254 are fixed.

FIGS. 6, 7, and 8 illustrate embodiments of the pedal support 25 comprising a pedal platform securing element 26. The platform securing element 26 can be used to better secure the pedal to the bicycle securing apparatus 100. In some embodiments, the pedal platform securing element 26 comprises a pedal support strap 265 and a strap securing element 266, and the strap securing element 266 is configured to secure the pedal support strap 265 over the bicycle pedal 63. The strap securing element 266 can be a pin, a buckle, or a strap securing means. In some embodiments, the pedal platform securing element 26 comprises a rotating element 263 that can rotate from a secured position, where there rotating element 263 limits or prevents vertical movement of the bicycle pedal 63, to a non-secured position, where there rotating element 263 does not limit or prevent vertical movement of the bicycle pedal 63. In some embodiments employing the pedal platform securing element 26, the pedal platform 251 does not have pedal platform holes 2541 and/or adjustable inner engagement projections 254.

Figure 9:
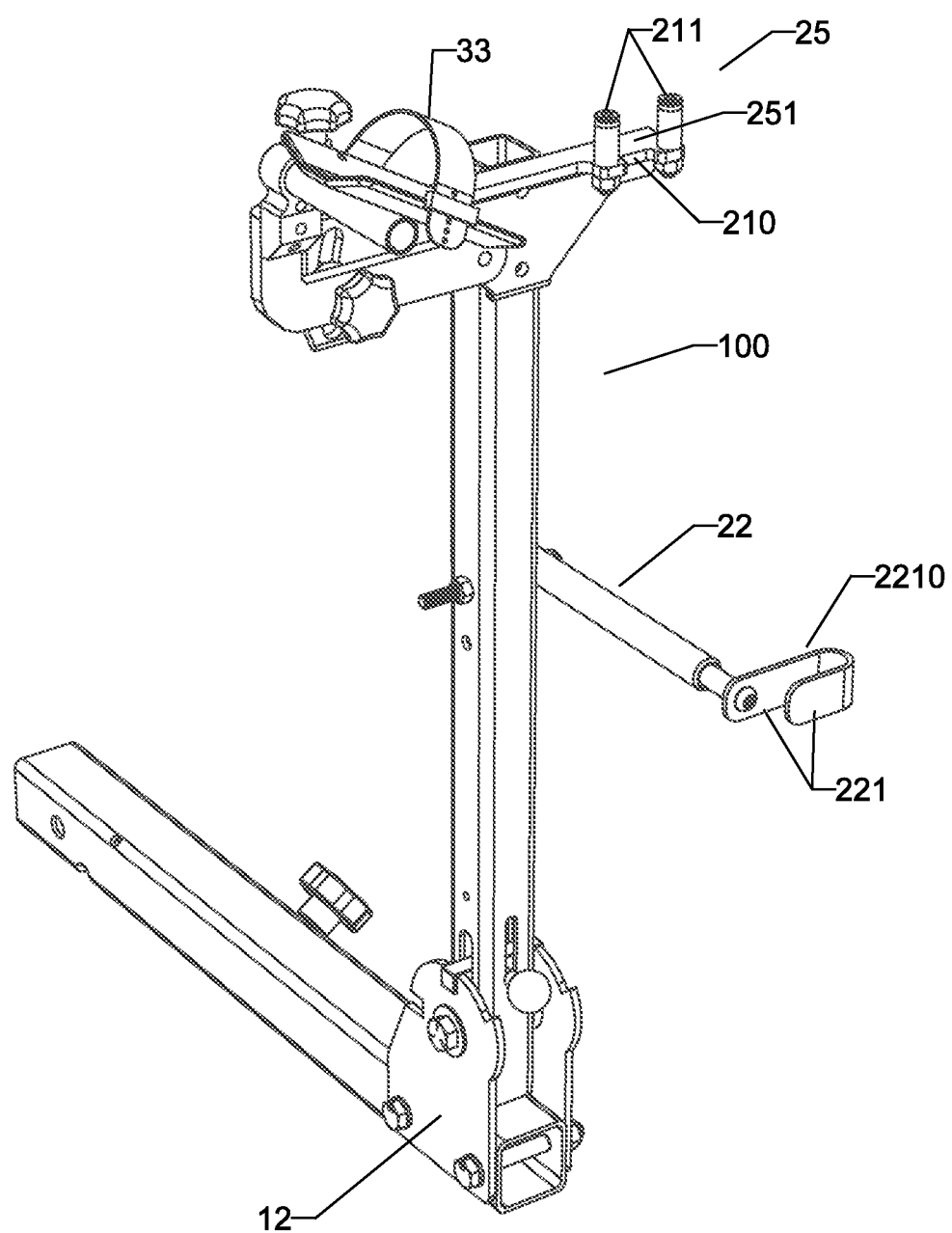
FIG. 9 shows an embodiment of a bicycle securing apparatus having an embodiment of an engagement member wherein the projections are defined by a U-shaped member.

FIG. 9 illustrates an embodiment of a bicycle securing apparatus 100. In some embodiments, the outer engagement means 22 comprises one or more outer engagement projections 221 that are the ends of a U-shaped member 2210 that is configured to accept a crank 62 inside. The U-shaped member 2210 can help prevent rotation of the bicycle 6 about the horizontal axis.

Figure 10:
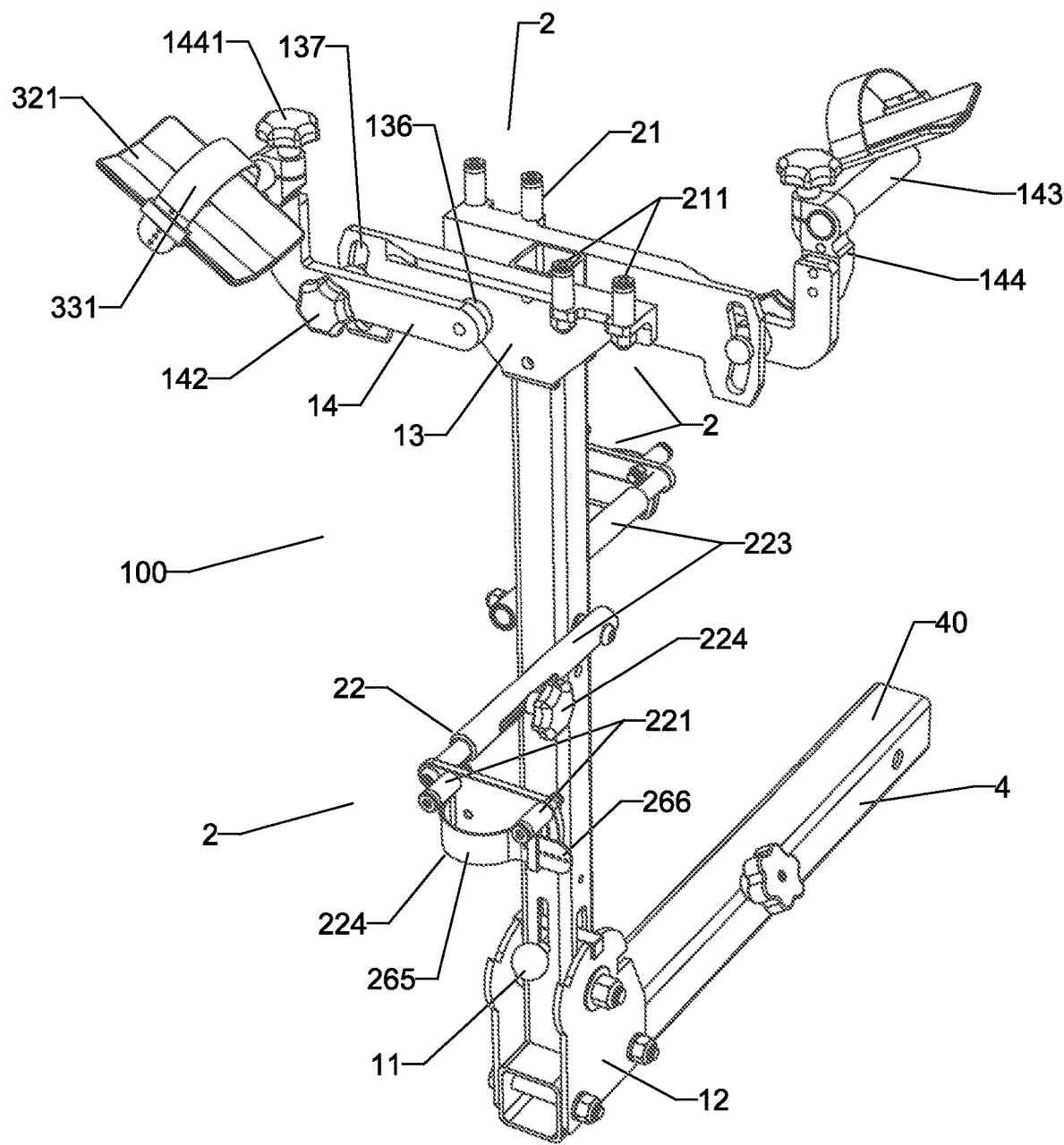
FIG. 10 shows an embodiment of a bicycle securing apparatus having the ability to secure two bicycles.

FIG. 10 illustrates an embodiment of a bicycle securing apparatus 100. The embodiment of the bicycle securing apparatus 100 comprises a vertical member 1, one or more engagement members 2, and an anti-rotation member 3. Some embodiments comprise a base 4.

The engagement member 2 comprises an outer engagement means 22, an inner engagement means 21, or a combination thereof, coupled to the vertical member 1. Each engagement member 2 is configured to limit the movement of a bicycle pedal 63 and/or a crank 62. In some embodiments, the outer engagement means 22 comprises one or more outer engagement projections 221. In some embodiments, the outer engagement means 22 comprises an outer engagement extender 223 that is coupled to the vertical member 1 and is configured to allow a user selectively adjust the distance of the outer engagement means 22 from the vertical member 1, to accommodate bicycles 6 of different widths. In some embodiments, the outer engagement means 22 comprises an outer engagement securing member 224 that enables to user to fix the distance between the outer engagement means 22 and the vertical member 1. In some embodiments, the outer engagement means 22 is capable of rotating between an extended position to a storage position. In some embodiments, the extended position the outer engagement means 22 extends from the vertical member 1, and in the storage position, the outer engagement means 22 the outer engagement means 22 is aligned with the vertical member 1. In some embodiments, the outer engagement means 22 is pivotally coupled to the vertical member 1.

In some embodiments, the inner engagement means 21 comprises a pedal platform 251. In some embodiments, the inner engagement means 21 comprises and one or more inner engagement projections 211. In some embodiments configured to secure two bicycles, there are inner engagement means 21 on both sides of the vertical member 1. In some embodiments, the inner engagement means 21 are offset from each other. In some embodiments, the inner engagement means 21 comprises two or more inner engagement projections 211 that is configured to accept the crank 62 therein.

In some embodiments, the bicycle retaining means 10 is configured to accept two bicycles 6. In such an embodiment, the items present on one side of the vertical member 1 are mirrored on the other side of the vertical member 1.

In some embodiments, each lateral extension element 13 defines a lateral extension element pivot hole 136 and lateral extension element groove 137. Each lateral extension element 13 is coupled to the vertical member 1. In some embodiments, there are two lateral extension elements 13, on either side of the vertical member 1, and extend in opposite directions. In some embodiments, the lateral extension element 13 comprises the inner engagement means 21.

In some embodiments, the bicycle securing apparatus 100 comprises lever element 14. Each lever element 14 is coupled to the lateral extension element 13. The lever element 14 comprises a lever element pivot 141 that engages the lateral extension element pivot hole 136. In some embodiments, the lever element 14 comprises a lever fixing member 142 that engages the lateral extension element groove 137. In some embodiments, the anti-rotation receiver 32 is coupled to the lever element 14 by a anti-rotation connector 143. In some embodiments, the anti-rotation connector 143, which is coupled to the anti-rotation connector securing element 144, is able to rotate and/or adjust linearly to accept bicycles of different sizes. In some embodiments, the lever element 14, lever fixing member 142, the anti-rotation connector 143 allows for vertical adjustment of the anti-rotation receiver 32 to accept bicycles of differing sizes and a means for keeping the adjustment fixed, such as a discrete or continuous adjustment positions. In some embodiments, the anti-rotation connector 143 is coupled to the lever element 14 via a anti-rotation connector securing element 144. In some embodiments, the anti-rotation connector securing element 144, which is coupled to the lever element 14, allows the anti-rotation connector 143 to rotate, extend back and forth linearly, and/or be selectively secured in the desired position. In some embodiments, the anti-rotation connector securing element 144 comprises a anti-rotation connector lock 1441 configured to selectively secure the anti-rotation connector 143 in the desired position. In some embodiments, the anti-rotation connector lock 1441 can increase or decrease an interference fit between the anti-rotation connector securing element 144 and the anti-rotation connector 143. In some embodiments, the anti-rotation connector securing element 144 moves relative to the lever element 14. In some embodiments, the anti-rotation connector securing element 144 is able to rotate vertically and/or horizontally.

In some embodiments, the base 4 comprises a base restraining element 41. The base restraining element 41 comprises a restraining element actuator 411. In some embodiments, the restraining element actuator 411 comprises a knob.

In some embodiments, the bicycle securing apparatus 100 comprises a position selector 12 that is coupled to the vertical member 1 and the base 4. In some embodiments, the vertical member 1 comprises a selector 11 that is configured to engage one or more securing positions 121 defined by the position selector 12. In some embodiments, the selector 11 comprises a selector member 112 that is configured to slide in and out of the securing positions 121. In some embodiments, there is a first securing position 121 and a second securing position 121. In some embodiments, there is a third securing position 121. In some embodiments, the selector member 112 is actuated by an engagement handle 111. In some embodiments, the selector 11 is biased to an engaged position. In use, a user is able to actuate the engagement handle 111, rotate the vertical member 1 to a desired location, and the release the engagement handle 111 allowing the selector member 112 to engage a securing position 121. In some embodiments, the vertical member 1 is configured to rotate relative to the base 4 and/or position selector 12. In some embodiments, the vertical member 1 pivots about a pivot 122. In some embodiments, the pivot 122 is a bolt.

In some embodiments, the location of the anti-rotation member 3 and the outer engagement member 22 can be adjusted to fit bicycles of different Q Factors. In some embodiments, the outer engagement member 22 can move from a retracted position to an extended position, and the length of the outer engagement, and/or the distance from the vertical member 1, can be adjusted. Bicycles with smaller Q Factors will result in the outer engagement means 22 and anti-rotation member 3 that are closer to the vertical member 1 than bicycles with larger Q Factors. The extension of the anti-rotation member 3 and the outer engagement means 22 is determined by the Q Factor of the bicycle 6 and bicycles with smaller Q Factor includes, but is not limited to, the distance between the bicycle pedal 63 attachment points on the crank 62 arms, when measured parallel to the bottom bracket axle of a bicycle 6.

Figure 11:
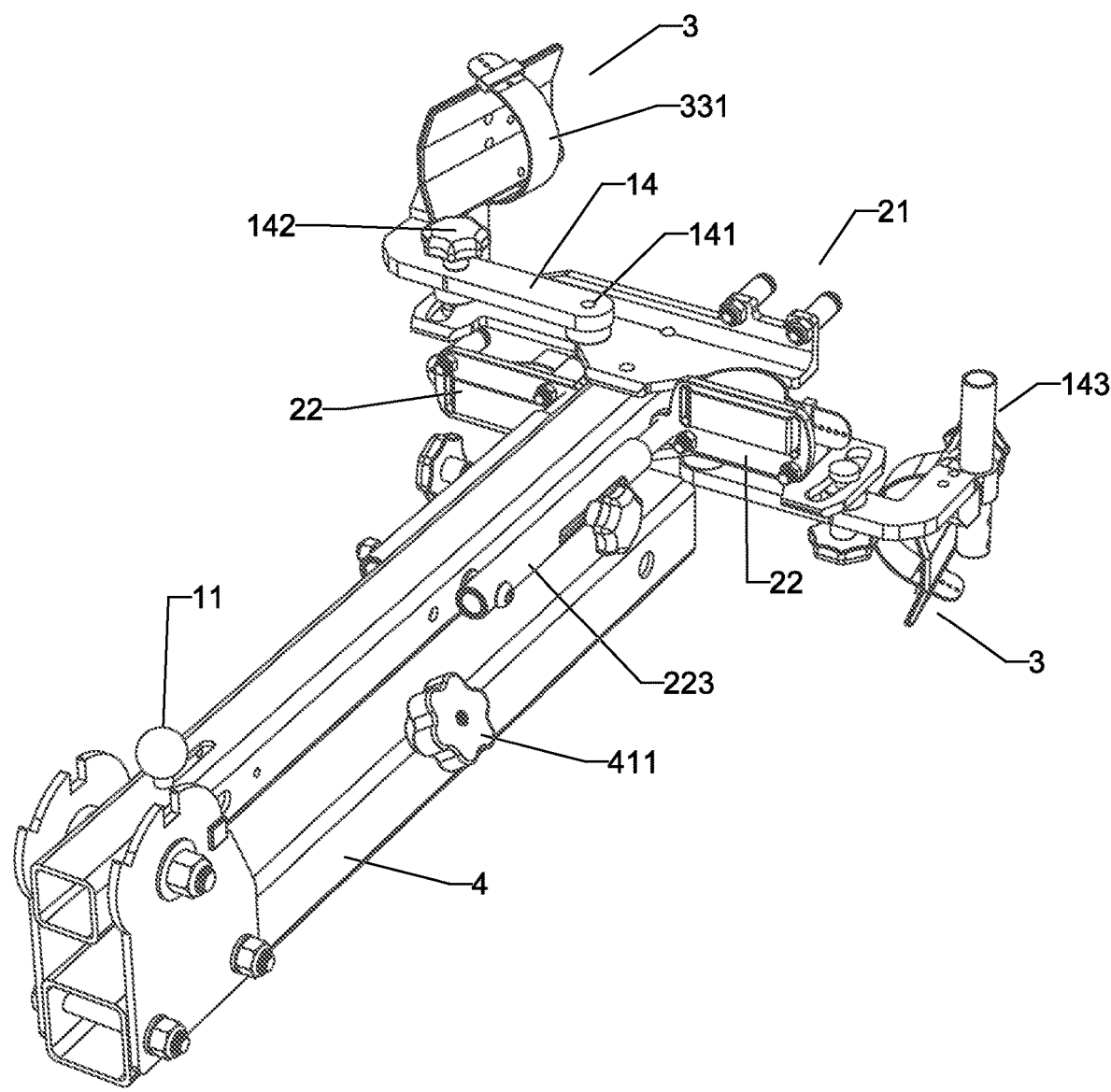
FIG. 11 shows an embodiment of a bicycle securing apparatus in a folded configuration.

FIG. 11 illustrates an embodiment of the bicycle securing apparatus 100 where the vertical member 1 has been selectively placed substantially parallel to the base 4 for ease of storage. Furthermore, the anti-rotation members 3 can be retracted by sliding the anti-rotation connector 143 through the anti-rotation connector securing element 144. Additionally, as mentioned above, the outer engagement members 22 can be rotated such that they are substantially flush with the vertical member 1. As a means to help with storage, the restraining element actuator 411 can be placed diagonally, as shown, or on the side, so as not to get in the way of the vertical member 1 when in a storage position nor to prevent the base 4 from being flush with a surface. In some embodiments, the bicycle securing apparatus 100 is configured such that when it is in a storage position, the bicycle securing apparatus 100 is able to have the base 4 lie flush on a surface.

Figure 12:
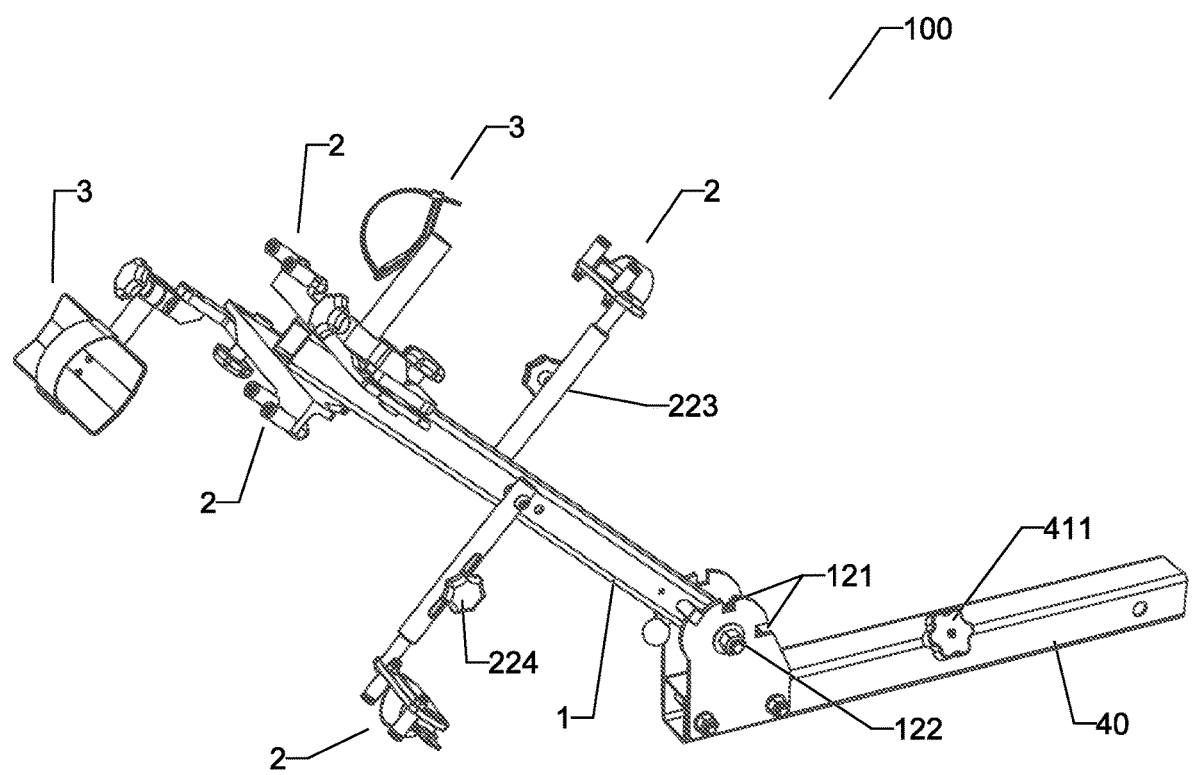
FIG. 12 shows an embodiment of a bicycle securing apparatus in an obtuse position.

FIG. 12 illustrates an embodiment of the bicycle securing apparatus 100 in an obtuse position. In such a position, and attached to a vehicle, the user is more easily able to access the rear of their vehicle. It will allow for the opening of a hatchback or a trunk.

Figure 13:
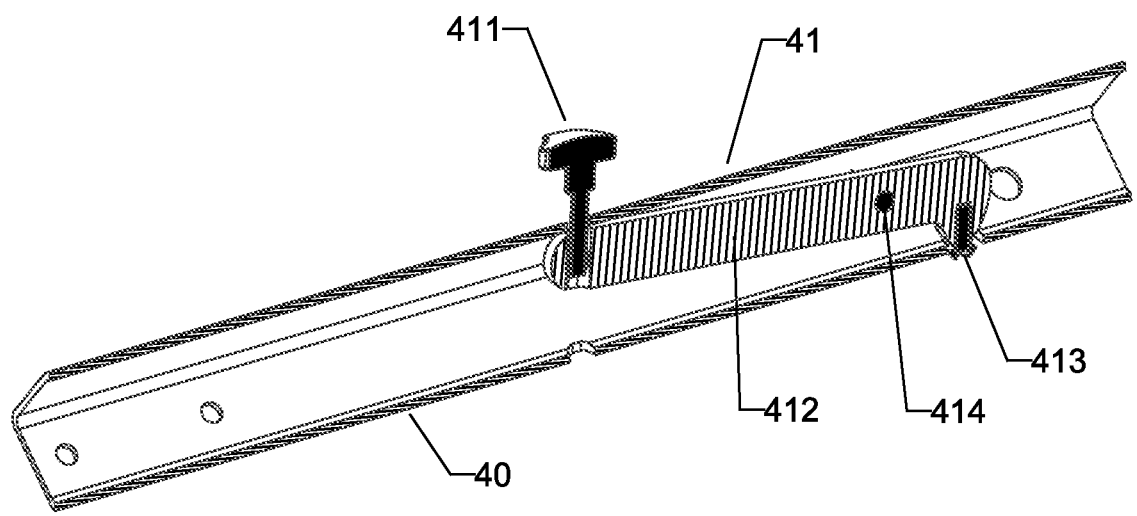
FIG. 13 shows an embodiment of the base restraining element.

FIG. 13 illustrates an embodiment of a base restraining element 41. The base restraining element 41 comprises a restraining element actuator 411 coupled to a restraining element arm 412, and the restraining element arm 412 is coupled to a receiver abutment 413. In some embodiments, the restraining element actuator 411 comprises a threaded element that engages the restraining element arm 412 such that actuation of the restraining element actuator 411 increases or decreases the receiver abutment 413 by moving the restraining element arm 412. The receiver abutment 413 is configured to increase or decrease the effective periphery of the base body 40 and thus increase or decrease the force of the interference fit between the hitch receiver 5 and elements of the base 4 therein. In some embodiments, the restraining element arm 412 rotates about a base restraining pivot 414 point. In some embodiments, the receiver abutment 413 comprises an elastic material. In some embodiments, the base restraining element 41 can help secure the base 4 to a hitch receiver 5 and increase the difficulty in removing base 4 from the hitch receiver 5 and/or prevents some rotational movement between the base 4 and the hitch receiver 5 that often results in rattling and unwanted movement of the bicycle securing apparatus 100 and the hitch receiver 5. In some embodiments, the restraining element actuator 411 comprises a locking means. In some embodiments, the locking means comprises a feature that requires a key to enable the actuation of the restraining element actuator 411.

In some embodiments, the engagement member 2 comprises a pad to provide a softer area in which the bicycle pedal 63 will engage. It is understood that all elements that are designed to engage a bicycle can have a coating or other element that is present at the point of contact to prevent scratching of the bicycle surfaces.

While most bicycle 6 racks secure the bicycle 6 by the wheels and/or the cross bars, the bicycle securing apparatus 100 employs the use of the bicycle's bicycle pedal 63 as the primary load-bearing member. This enables the bicycle securing apparatus 100 to maintain a smaller width as compared to current bicycle 6 racks. As seen in some embodiments, the bicycle securing apparatus 100 is substantially vertical, but for the anti-rotation member 3, and in some embodiments, the anti-rotation member 3 is retractable to maintain a small footprint. Embodiments having the ability to fold for storage, the bicycle securing apparatus 100 is far less bulky than bicycle racks of today. And even with the smaller footprint, the securing of the bicycle 6 by the crank 62 and/or pedals 63 provides for a very secure structural support, and the anti-rotation member 3 prevents rotation.

Some embodiments comprise a vertical member 1; a first engagement member 2, coupled to the vertical member 1, comprising a means for attaching to a bicycle pedal 63; and an anti-rotation member 3, coupled to the vertical member 1 or the first engagement member 2, comprising a means for attaching to a bicycle 6. Wherein the first engagement member 2 is configured to attach to said bicycle pedal 63 and limit movement of said bicycle pedal 63, and the anti-rotation member 3 is configured to attach to said bicycle 6 at a location other than said bicycle pedal 63 and limit rotation of a said bicycle 6 about the first engagement member 2.

In some embodiments, the means for attaching to said bicycle pedal 63 comprises a pedal platform 251, a pedal platform securing element 26, a rotating element 263, one or more projections, or a combination thereof; and the means for attaching to said bicycle 6 comprises an anti-rotation receiver 32, an anti-rotation securing member 33, or a combination thereof.

Some embodiments further comprise a second engagement member 2, wherein the first engagement member 2 comprises an inner engagement member 21 and the second engagement member 2 comprises an outer engagement member 22; and the inner engagement member 21 and the outer engagement member 22 define a plane, and the outer engagement member 22 extends further from the vertical member 1 than the inner engagement member 21.

In some embodiments, the plane is offset from the vertical member 1.

In some embodiments, the first engagement member 2 comprises an inner engagement member 21; and the inner engagement member 21 comprises at least one inner engagement projection and a pedal platform 251.

In some embodiment, the pedal platform 251 defines one or more pedal platform holes 2541, and each inner engagement projection are configured to be inserted inside at least one of the one or more pedal platform holes 2541.

In some embodiments, the pedal platform 251 defines a notch 210.

Some embodiments further comprise a second engagement member 2, wherein the second engagement member 2 comprises an outer engagement member 22; and the outer engagement member 22 comprises one or more outer engagement projections 221.

In some embodiments, the outer engagement member 22 is configured to move from an extended position to and retracted position; and in the retracted position the outer engagement projections 221 are closer to the vertical member 1 than when the outer engagement member 22 is in the extended position.

In some embodiments, the anti-rotation member 3 comprises an anti-rotation receiver 32, an anti-rotation strap 331, or a combination thereof.

In some embodiments, the anti-rotation member 3 is coupled to the vertical member 1 or the first engagement member 2 by an anti-rotation connector.

In some embodiments, the anti-rotation connector comprises a lever element 14, and a lever fixing member 142 comprising a means to fix the lever element 14 in relation to the vertical member 1.

Some embodiments further comprise a lateral extension element 13 that is coupled to the vertical member 1, wherein the lever fixing member 142 is configured to engage the lateral extension element 13 and selectively fix the lever element 14.

In some embodiments, the anti-rotation connector comprises a lever element 14 coupled to the vertical member 1 or the first engagement member 2, the anti-rotation member 3 comprises a anti-rotation connector 143 coupled to the lever element 14, and the anti-rotation connector 143 is configured to allow a user to selectively adjust a distance between the vertical member 1 and the anti-rotation receiver 32, the anti-rotation strap 331, or the combination thereof.

In some embodiments, the anti-rotation connector comprises a lever element 14 coupled to the vertical member 1 or the first engagement member 2, and the anti-rotation connector is to allow a user to selectively adjust a location of the anti-rotation receiver 32, the anti-rotation strap 331, or the combination thereof.

Some embodiments, further comprising a base 4 coupled to the vertical member 1.

In some embodiments, a position selector 12 couples the base 4 to the vertical member 1, and the position selector 12 is configured to allow the vertical member 1 to move relative to the base 4.

In some embodiments, the vertical member 1 comprises a selector 11, and the selector 11 is configured to interact with the position selector 12 to allow a user to selectively determine a position of the vertical member 1 relative to the base 4.

In some embodiments, the vertical member 1 comprises a selector 11, and the selector 11 is configured to interact with the position selector 12 to allow a user to selectively determine an angle defined the vertical member 1 the base 4.

In some embodiments, the angle is obtuse or square.

In some embodiments, the position selector 12 defines a first securing position 121 and a second securing position 121 in which the selector 11 is configured to selectively engage.

In some embodiments, when the selector 11 is in the first securing position 121 the base 4 and the vertical member 1 are substantially parallel, and when the selector 11 is in the second securing position 121, the base 4 that the and the vertical member 1 are substantially perpendicular.

In some embodiments, the position selector 12 defines a first securing position 121, a second securing position 121, and a third securing position 121, in which the selector 11 is configured to selectively engage, when the selector 11 is in the first securing position 121 the base 4 and the vertical member 1 are substantially parallel, when the selector 11 is in the second securing position 121, the base 4 that the and the vertical member 1 are substantially perpendicular, and when the selector 11 is in the third securing position 121, the vertical member 1 and the base 4 define an obtuse angle.

In some embodiments, the selector 11 comprises a securing member that is configured to selectively engage the position selector 12.

In some embodiments, the securing member is coupled to an engagement handle 111.

In some embodiments, the securing member is biased towards the position selector 12.

In some embodiments, the base 4 comprises a base body 40.

In some embodiments, the base 4 further comprises a base restraining element 41, and the base restraining element 41 comprises a means to selectively limit movement of the base 4 when at least a portion of the base 4 is located in a hitch receiver 5.

In some embodiments, the means to selectively limit movement of the base 4 comprises a restraining element actuator 411.

In some embodiments, the base restraining element 41 comprises a receiver abutment 413 configured to selectively establish an interference fit between the base body 40 and said hitch receiver 5, increase the interference fit between the base body 40 and said hitch receiver 5, or a combination thereof.

In some embodiments, the base restraining element 41 further comprises a restraining element actuator 411 configured to control the receiver abutment 413.

In some embodiments, the first engagement member 2 comprises an inner engagement member 21; and the inner engagement member 21 comprises two or more projections.

In some embodiments, the outer engagement member 22 has an adjustable length.

Some embodiments comprise: a vertical member 1; a means for attaching to a bicycle pedal 63, that is coupled to the vertical member 1; and a means for attaching to a bicycle 6, that is coupled to the vertical member 1 or the means for attaching to said bicycle pedal 63. Wherein a means for attaching to said bicycle pedal 63 is configured to attach to said bicycle pedal 63 and limit movement of said bicycle pedal 63, and the a means for attaching to said bicycle 6 is configured to attach to said bicycle 6 at a location other than said bicycle pedal 63 and limit rotation of a said bicycle 6 about the means for attaching to said bicycle pedal 63.

In some embodiments, the means for attaching to said bicycle pedal 63 comprises a first engagement member 2; the first engagement member 2 comprises a pedal platform 251, a pedal platform securing element 26, a rotating element 263, one or more projections, or a combination thereof; and the means for attaching to said bicycle 6 comprises an anti-rotation receiver 32, an anti-rotation securing member 33, or a combination thereof.

Some embodiments further comprise a second engagement member 2, wherein the first engagement member 2 comprises an inner engagement member 21 and the second engagement member 2 comprises an outer engagement member 22; and the inner engagement member 21 and the outer engagement member 22 define a plane, and the outer engagement member 22 extends further from the vertical member 1 than the inner engagement member 21.

In some embodiments, the plane is offset from the vertical member 1.

In some embodiments, the first engagement member 2 comprises an inner engagement member 21; and the inner engagement member 21 comprises at least one inner engagement projection and a pedal platform 251.

In some embodiments, the pedal platform 251 defines one or more pedal platform holes 2541, and each inner engagement projection are configured to be inserted inside at least one of the one or more pedal platform holes 2541.

In some embodiments, the pedal platform 251 defines a notch 210.

Some embodiments further comprise a second engagement member 2, wherein the second engagement member 2 comprises an outer engagement member 22; and the outer engagement member 22 comprises one or more outer engagement projections 221.

In some embodiments, the outer engagement member 22 is configured to move from an extended position to and retracted position; and in the retracted position the outer engagement projections 221 are closer to the vertical member 1 than when the outer engagement member 22 is in the extended position.

In some embodiments, the means for attaching to said bicycle 6 comprises an anti-rotation member 3 that comprises an anti-rotation receiver 32, an anti-rotation strap 331, or a combination thereof.

In some embodiments, the anti-rotation member 3 is coupled to the vertical member 1 or the first engagement member 2 by an anti-rotation connector.

In some embodiments, the anti-rotation connector comprises a lever element 14, and a lever fixing member 142 comprising a means to fix the lever element 14 in relation to the vertical member 1.

Some embodiments further comprise a lateral extension element 13 that is coupled to the vertical member 1, wherein the lever fixing member 142 is configured to engage the lateral extension element 13 and selectively fix the lever element 14.

In some embodiments, the anti-rotation connector comprises a lever element 14 coupled to the vertical member 1 or the first engagement member 2, the anti-rotation member 3 comprises a anti-rotation connector 143 coupled to the lever element 14, and the anti-rotation connector 143 is configured to allow a user to selectively adjust a distance between the vertical member 1 and the anti-rotation receiver 32, the anti-rotation strap 331, or the combination thereof.

In some embodiments, the anti-rotation connector comprises a lever element 14 coupled to the vertical member 1 or the first engagement member 2, and the anti-rotation connector is to allow a user to selectively adjust a location of the anti-rotation receiver 32, the anti-rotation strap 331, or the combination thereof.

Some embodiments further comprise a base 4 coupled to the vertical member 1.

In some embodiments, a position selector 12 couples the base 4 to the vertical member 1, and the position selector 12 is configured to allow the vertical member 1 to move relative to the base 4.

In some embodiments, the vertical member 1 comprises a selector 11, and the selector 11 is configured to interact with the position selector 12 to allow a user to selectively determine a position of the vertical member 1 relative to the base 4.

In some embodiments, the vertical member 1 comprises a selector 11, and the selector 11 is configured to interact with the position selector 12 to allow a user to selectively determine an angle defined the vertical member 1 the base 4.

In some embodiments, the angle is obtuse or square.

In some embodiments, the position selector 12 defines a first securing position 121 and a second securing position 121 in which the selector 11 is configured to selectively engage.

In some embodiments, when the selector 11 is in the first securing position 121 the base 4 and the vertical member 1 are substantially parallel, and when the selector 11 is in the second securing position 121, the base 4 that the and the vertical member 1 are substantially perpendicular.

In some embodiments, the position selector 12 defines a first securing position 121, a second securing position 121, and a third securing position 121, in which the selector 11 is configured to selectively engage, when the selector 11 is in the first securing position 121 the base 4 and the vertical member 1 are substantially parallel, when the selector 11 is in the second securing position 121, the base 4 that the and the vertical member 1 are substantially perpendicular, and when the selector 11 is in the third securing position 121, the vertical member 1 and the base 4 define an obtuse angle.

In some embodiments, the selector 11 comprises a securing member that is configured to selectively engage the position selector 12.

In some embodiments, wherein the securing member is coupled to an engagement handle 111.

In some embodiments, the securing member is biased towards the position selector 12.

In some embodiments, the base 4 comprises a base body 40.

In some embodiments, the base 4 further comprises a base restraining element 41, and the base restraining element 41 comprises a means to selectively limit movement of the base 4 when at least a portion of the base 4 is located in a hitch receiver 5.

In some embodiments, the means to selectively limit movement of the base 4 comprises a restraining element actuator 411.

In some embodiments, the base restraining element 41 comprises a receiver abutment 413 configured to selectively establish an interference fit between the base body 40 and said hitch receiver 5, increase the interference fit between the base body 40 and said hitch receiver 5, or a combination thereof.

In some embodiments, the base restraining element 41 further comprises a restraining element actuator 411 configured to control the receiver abutment 413.

In some embodiments, the first engagement member 2 comprises an inner engagement member 21; and the inner engagement member 21 comprises two or more projections.

In some embodiments, the outer engagement member 22 has an adjustable length.

Some embodiments comprise: a vertical member 1; a first engagement member 2, coupled to the vertical member 1, configured to secure a bicycle pedal 63; and an anti-rotation member 3, coupled to the vertical member 1 or the first engagement member 2, configured to attach to a bicycle 6 at a location other than said bicycle pedal 63. Wherein the first engagement member 2 is configured to limit movement of said bicycle pedal 63, and the anti-rotation member 3 is configured to limit rotation of a said bicycle 6 about the first engagement member 2.

In some embodiments, the first engagement member 2 comprises a pedal platform 251, a pedal platform securing element 26, a rotating element 263, one or more projections, or a combination thereof; and the anti-rotation member 3 comprises an anti-rotation receiver 32, an anti-rotation securing member 33, or a combination thereof.

Some embodiments further comprise a second engagement member 2, wherein the first engagement member 2 comprises an inner engagement member 21 and the second engagement member 2 comprises an outer engagement member 22; and the inner engagement member 21 and the outer engagement member 22 define a plane, and the outer engagement member 22 extends further from the vertical member 1 than the inner engagement member 21.

In some embodiments, the plane is offset from the vertical member 1.

In some embodiments, the first engagement member 2 comprises an inner engagement member 21; and the inner engagement member 21 comprises at least one inner engagement projection and a pedal platform 251.

In some embodiments, the pedal platform 251 defines one or more pedal platform holes 2541, and each inner engagement projection are configured to be inserted inside at least one of the one or more pedal platform holes 2541.

In some embodiments, the pedal platform 251 defines a notch 210.

Some embodiments further comprise a second engagement member 2, wherein the second engagement member 2 comprises an outer engagement member 22; and the outer engagement member 22 comprises one or more outer engagement projections 221.

In some embodiments, the outer engagement member 22 is configured to move from an extended position to and retracted position; and in the retracted position the outer engagement projections 221 are closer to the vertical member 1 than when the outer engagement member 22 is in the extended position.

In some embodiments, the anti-rotation member 3 comprises an anti-rotation receiver 32, an anti-rotation strap 331, or a combination thereof.

In some embodiments, the anti-rotation member 3 is coupled to the vertical member 1 or the first engagement member 2 by an anti-rotation connector.

In some embodiments, the anti-rotation connector comprises a lever element 14, and a lever fixing member 142 comprising a means to fix the lever element 14 in relation to the vertical member 1.

Some embodiments further comprise a lateral extension element 13 that is coupled to the vertical member 1, wherein the lever fixing member 142 is configured to engage the lateral extension element 13 and selectively fix the lever element 14.

In some embodiments, the anti-rotation connector comprises a lever element 14 coupled to the vertical member 1 or the first engagement member 2, the anti-rotation member 3 comprises a anti-rotation connector 143 coupled to the lever element 14, and the anti-rotation connector 143 is configured to allow a user to selectively adjust a distance between the vertical member 1 and the anti-rotation receiver 32, the anti-rotation strap 331, or the combination thereof.

In some embodiments, the anti-rotation connector comprises a lever element 14 coupled to the vertical member 1 or the first engagement member 2, and the anti-rotation connector is to allow a user to selectively adjust a location of the anti-rotation receiver 32, the anti-rotation strap 331, or the combination thereof.

Some embodiments further comprise a base 4 coupled to the vertical member 1.

In some embodiments, a position selector 12 couples the base 4 to the vertical member 1, and the position selector 12 is configured to allow the vertical member 1 to move relative to the base 4.

In some embodiments, the vertical member 1 comprises a selector 11, and the selector 11 is configured to interact with the position selector 12 to allow a user to selectively determine a position of the vertical member 1 relative to the base 4.

In some embodiments, the vertical member 1 comprises a selector 11, and the selector 11 is configured to interact with the position selector 12 to allow a user to selectively determine an angle defined the vertical member 1 the base 4.

In some embodiments, the angle is obtuse or square.

In some embodiments, the position selector 12 defines a first securing position 121 and a second securing position 121 in which the selector 11 is configured to selectively engage.

In some embodiments, when the selector 11 is in the first securing position 121 the base 4 and the vertical member 1 are substantially parallel, and when the selector 11 is in the second securing position 121, the base 4 that the and the vertical member 1 are substantially perpendicular.

In some embodiments, the position selector 12 defines a first securing position 121, a second securing position 121, and a third securing position 121, in which the selector 11 is configured to selectively engage, when the selector 11 is in the first securing position 121 the base 4 and the vertical member 1 are substantially parallel, when the selector 11 is in the second securing position 121, the base 4 that the and the vertical member 1 are substantially perpendicular, and when the selector 11 is in the third securing position 121, the vertical member 1 and the base 4 define an obtuse angle.

In some embodiments, the selector 11 comprises a securing member that is configured to selectively engage the position selector 12.

In some embodiments, the securing member is coupled to an engagement handle 111.

In some embodiments, the securing member is biased towards the position selector 12.

In some embodiments, the base 4 comprises a base body 40.

In some embodiments, the base 4 further comprises a base restraining element 41, and the base restraining element 41 comprises a means to selectively limit movement of the base 4 when at least a portion of the base 4 is located in a hitch receiver 5.

In some embodiments, the means to selectively limit movement of the base 4 comprises a restraining element actuator 411.

In some embodiments, the base restraining element 41 comprises a receiver abutment 413 configured to selectively establish an interference fit between the base body 40 and said hitch receiver 5, increase the interference fit between the base body 40 and said hitch receiver 5, or a combination thereof.

In some embodiments, the base restraining element 41 further comprises a restraining element actuator 411 configured to control the receiver abutment 413.

In some embodiments, the first engagement member 2 comprises an inner engagement member 21; and the inner engagement member 21 comprises two or more projections.

In some embodiments, the outer engagement member 22 has an adjustable length.

Some embodiments comprise: a bicycle comprising a bicycle pedal; a vertical member 1; a first engagement member 2, coupled to the vertical member 1, configured to secure to the bicycle pedal 63; and an anti-rotation member 3, coupled to the vertical member 1 or the first engagement member 2, configured to attach to the bicycle 6 at a location other than the bicycle pedal 63. Wherein the first engagement member 2 is configured to limit movement of the bicycle pedal 63, and the anti-rotation member 3 is configured to limit rotation of the bicycle 6 about the first engagement member 2.

In some embodiments, the first engagement member 2 comprises a pedal platform 251, a pedal platform securing element 26, a rotating element 263, one or more projections, or a combination thereof; and the anti-rotation member 3 comprises an anti-rotation receiver 32, an anti-rotation securing member 33, or a combination thereof.

Some embodiments further comprise a second engagement member 2, wherein the first engagement member 2 comprises an inner engagement member 21 and the second engagement member 2 comprises an outer engagement member 22; and the inner engagement member 21 and the outer engagement member 22 define a plane, and the outer engagement member 22 extends further from the vertical member 1 than the inner engagement member 21.

In some embodiments, the plane is offset from the vertical member 1.

In some embodiments, the first engagement member 2 comprises an inner engagement member 21; and the inner engagement member 21 comprises at least one inner engagement projection and a pedal platform 251.

In some embodiments, the pedal platform 251 defines one or more pedal platform holes 2541, and each inner engagement projection are configured to be inserted inside at least one of the one or more pedal platform holes 2541.

In some embodiments, the pedal platform 251 defines a notch 210.

Some embodiments further comprise a second engagement member 2, wherein the second engagement member 2 comprises an outer engagement member 22; and the outer engagement member 22 comprises one or more outer engagement projections 221.

In some embodiments, the outer engagement member 22 is configured to move from an extended position to and retracted position; and in the retracted position the outer engagement projections 221 are closer to the vertical member 1 than when the outer engagement member 22 is in the extended position.

In some embodiments, the anti-rotation member 3 comprises an anti-rotation receiver 32, an anti-rotation strap 331, or a combination thereof.

In some embodiments, the anti-rotation member 3 is coupled to the vertical member 1 or the first engagement member 2 by an anti-rotation connector.

In some embodiments, the anti-rotation connector comprises a lever element 14, and a lever fixing member 142 comprising a means to fix the lever element 14 in relation to the vertical member 1.

Some embodiments further comprise a lateral extension element 13 that is coupled to the vertical member 1, wherein the lever fixing member 142 is configured to engage the lateral extension element 13 and selectively fix the lever element 14.

In some embodiments, the anti-rotation connector comprises a lever element 14 coupled to the vertical member 1 or the first engagement member 2, the anti-rotation member 3 comprises a anti-rotation connector 143 coupled to the lever element 14, and the anti-rotation connector 143 is configured to allow a user to selectively adjust a distance between the vertical member 1 and the anti-rotation receiver 32, the anti-rotation strap 331, or the combination thereof.

In some embodiments, the anti-rotation connector comprises a lever element 14 coupled to the vertical member 1 or the first engagement member 2, and the anti-rotation connector is to allow a user to selectively adjust a location of the anti-rotation receiver 32, the anti-rotation strap 331, or the combination thereof.

Some embodiments further comprise a base 4 coupled to the vertical member 1.

In some embodiments, a position selector 12 couples the base 4 to the vertical member 1, and the position selector 12 is configured to allow the vertical member 1 to move relative to the base 4.

In some embodiments, the vertical member 1 comprises a selector 11, and the selector 11 is configured to interact with the position selector 12 to allow a user to selectively determine a position of the vertical member 1 relative to the base 4.

In some embodiments, the vertical member 1 comprises a selector 11, and the selector 11 is configured to interact with the position selector 12 to allow a user to selectively determine an angle defined the vertical member 1 the base 4.

In some embodiments, the angle is obtuse or square.

In some embodiments, the position selector 12 defines a first securing position 121 and a second securing position 121 in which the selector 11 is configured to selectively engage.

In some embodiments, when the selector 11 is in the first securing position 121 the base 4 and the vertical member 1 are substantially parallel, and when the selector 11 is in the second securing position 121, the base 4 that the and the vertical member 1 are substantially perpendicular.

In some embodiments, the position selector 12 defines a first securing position 121, a second securing position 121, and a third securing position 121, in which the selector 11 is configured to selectively engage, when the selector 11 is in the first securing position 121 the base 4 and the vertical member 1 are substantially parallel, when the selector 11 is in the second securing position 121, the base 4 that the and the vertical member 1 are substantially perpendicular, and when the selector 11 is in the third securing position 121, the vertical member 1 and the base 4 define an obtuse angle.

In some embodiments, the selector 11 comprises a securing member that is configured to selectively engage the position selector 12.

In some embodiments, the securing member is coupled to an engagement handle 111.

In some embodiments, the securing member is biased towards the position selector 12.

In some embodiments, the base 4 comprises a base body 40.

In some embodiments, the base 4 further comprises a base restraining element 41, and the base restraining element 41 comprises a means to selectively limit movement of the base 4 when at least a portion of the base 4 is located in a hitch receiver 5.

In some embodiments, the means to selectively limit movement of the base 4 comprises a restraining element actuator 411.

In some embodiments, the base restraining element 41 comprises a receiver abutment 413 configured to selectively establish an interference fit between the base body 40 and said hitch receiver 5, increase the interference fit between the base body 40 and said hitch receiver 5, or a combination thereof.

In some embodiments, the base restraining element 41 further comprises a restraining element actuator 411 configured to control the receiver abutment 413.

In some embodiments, the first engagement member 2 comprises an inner engagement member 21; and the inner engagement member 21 comprises two or more projections.

In some embodiments, the outer engagement member 22 has an adjustable length.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however it is disclosed that elements of disclosed embodiments can be switched with corresponding elements of embodiments with the same name and/or number of other disclosed embodiments.

What is claimed is:

1. An apparatus comprising:
   a vertical member;
   a first engagement member, coupled to the vertical member, configured to secure a bicycle pedal; and
   an anti-rotation member, coupled to the vertical member or the first engagement member, configured to attach to a bicycle at a location other than said bicycle pedal;
   wherein the first engagement member is configured to limit movement of said bicycle pedal, and the anti-rotation member is configured to limit rotation of a said bicycle about the first engagement member;
   wherein the first engagement member comprises an inner engagement member; and the inner engagement member comprises at least one inner engagement projection and a pedal platform;
   wherein the pedal platform defines one or more pedal platform holes, and each inner engagement projection is configured to be inserted inside at least one of the one or more pedal platform holes, and wherein the pedal platform defines a notch.

2. The apparatus of claim 1, wherein the first engagement member comprises a pedal platform, a pedal platform securing element, a rotating element, one or more projections, or a combination thereof; and the anti-rotation member comprises an anti-rotation receiver, an anti-rotation securing member, or a combination thereof.

3. The apparatus of claim 1, further comprising a second engagement member, wherein the first engagement member comprises an inner engagement member and the second engagement member comprises an outer engagement member; and the inner engagement member and the
   outer engagement member define a plane, and the outer engagement member extends further from the vertical member than the inner engagement member;
   wherein the outer engagement member has an adjustable length.

4. The apparatus of claim 1, further comprising a second engagement member, wherein the second engagement member comprises an outer engagement member; and the outer engagement member comprises one or more outer engagement projections; and
   wherein the outer engagement member is configured to move from an extended position to a retracted position; and in the retracted position the outer engagement projections are closer to the vertical member than when the outer engagement member is in the extended position.

5. The apparatus of claim 1, wherein the first engagement member comprises an inner engagement member; and the inner engagement member comprises two or more projections.

6. An apparatus comprising:
   a vertical member;
   a first engagement member, coupled to the vertical member, configured to secure a bicycle pedal; and
   an anti-rotation member, coupled to the vertical member or the first engagement member, configured to attach to a bicycle at a location other than said bicycle pedal;
   wherein the first engagement member is configured to limit movement of said bicycle pedal, and the anti-rotation member is configured to limit rotation of said bicycle about the first engagement member;
   further comprising a base coupled to the vertical member;
   wherein a position selector couples the base to the vertical member, and the position selector is configured to allow the vertical member to move relative to the base;
   wherein the vertical member comprises a selector, and the selector is configured to interact with the position selector to allow a user to selectively determine a position of the vertical member relative to the base;

wherein the position selector defines a first securing position and a second securing position in which the selector is configured to selectively engage, and wherein when the selector is in the first securing position the base and the vertical member are substantially parallel, and when the selector is in the second securing position, the base and the vertical member are substantially perpendicular.

7. The apparatus of claim 6, wherein the position selector defines a third securing position, in which the selector is configured to selectively engage, when the selector is in the third securing position, the vertical member and the base define an obtuse angle.

8. The apparatus of claim 7, wherein the selector comprises a securing member that is configured to selectively engage the position selector, wherein the securing member is coupled to an engagement handle and is biased towards the position selector.

9. The apparatus of claim 6, wherein the vertical member comprises a selector, and the selector is configured to interact with the position selector to allow a user to selectively determine an angle defined between the vertical member and the base, wherein the angle is obtuse or square.

10. The apparatus of claim 6, wherein the base comprises a base body.

11. The apparatus of claim 10, wherein the base further comprises a base restraining element, and the base restraining element comprises a means to selectively limit movement of the base when at least a portion of the base is located in a hitch receiver, and wherein the means to selectively limit movement of the base comprises a restraining element actuator.

12. The apparatus of claim 11, wherein the base restraining element comprises a receiver abutment configured to selectively establish an interference fit between the base body and said hitch receiver, increase the interference fit between the base body and said hitch receiver, or a combination thereof.

13. The apparatus of claim 12, wherein the base restraining element further comprises a restraining element actuator configured to control the receiver abutment.

14. An apparatus comprising:
a vertical member;
a first engagement member, coupled to the vertical member, configured to secure a bicycle pedal; and
an anti-rotation member, coupled to the vertical member or the first engagement member, configured to attach to a bicycle at a location other than said bicycle pedal;
wherein the first engagement member is configured to limit movement of said bicycle pedal, and the anti-rotation member is configured to limit rotation of a said bicycle about the first engagement member;
further comprising a base coupled to the vertical member;
wherein a position selector couples the base to the vertical member, and the position selector is configured to allow the vertical member to move relative to the base;
wherein the base comprises a base body and a base restraining element, and the base restraining element comprises a means to selectively limit movement of the base when at least a portion of the base is located in a hitch receiver, and wherein the means to selectively limit movement of the base comprises a restraining element actuator.

15. The apparatus of claim 14, wherein the base restraining element comprises a receiver abutment configured to selectively establish an interference fit between the base body and said hitch receiver, increase the interference fit between the base body and said hitch receiver, or a combination thereof.

16. The apparatus of claim 15, wherein the base restraining element further comprises a restraining element actuator configured to control the receiver abutment.

17. The apparatus of claim 14, wherein the vertical member comprises a selector, and the selector is configured to interact with the position selector to allow a user to selectively determine a position of the vertical member relative to the base.

18. The apparatus of claim 17, wherein the position selector defines a first securing position and a second securing position in which the selector is configured to selectively engage, and wherein when the selector is in the first securing position the base and the vertical member are substantially parallel, and when the selector is in the second securing position, the base and the vertical member are substantially perpendicular.

19. The apparatus of claim 17, wherein the position selector defines a first securing position, a second securing position, and a third securing position, in which the selector is configured to selectively engage, when the selector is in the first securing position the base and the vertical member are substantially parallel, when the selector is in the second securing position, the base and the vertical member are substantially perpendicular, and when the selector is in the third securing position, the vertical member and the base define an obtuse angle.

20. The apparatus of claim 19, wherein the selector comprises a securing member that is configured to selectively engage the position selector, wherein the securing member is coupled to an engagement handle and is biased towards the position selector.

* * * * *